United States Patent [19]

Van Assema

[11] Patent Number: 5,172,870

[45] Date of Patent: Dec. 22, 1992

[54] METHOD OF WINDING AN ARMATURE AND ARMATURE PRODUCED BY THE METHOD

[75] Inventor: Johan Van Assema, Hoogeveen, Netherlands

[73] Assignee: U.S. Philips Corporation, New York, N.Y.

[21] Appl. No.: 570,243

[22] Filed: Aug. 17, 1990

[30] Foreign Application Priority Data

Aug. 29, 1989 [NL] Netherlands .................. 8902180

[51] Int. Cl.⁵ .................................... H02K 15/09
[52] U.S. Cl. .................................. 242/7.03; 29/598; 242/7.05 B; 310/198
[58] Field of Search ........... 242/7.03, 7.05 R, 7.05 A, 242/7.05 B, 7.09, 7.05 C, 7.11; 310/198, 208, 206, 179, 180; 29/598, 605

[56] References Cited

U.S. PATENT DOCUMENTS

| | | | |
|---|---|---|---|
| 1,661,331 | 3/1928 | Gomory | 242/7.05 A |
| 1,845,116 | 2/1932 | Apple | 242/7.03 |
| 2,015,562 | 9/1935 | Kilgore | 310/198 |
| 2,714,174 | 7/1955 | Applegate | 242/7.03 |
| 2,873,924 | 2/1959 | Glazier et al. | 242/7.03 |
| 3,389,865 | 6/1968 | Stuckey | 242/1.1 R |
| 3,652,888 | 3/1972 | Harrington | 310/198 |
| 3,705,459 | 12/1972 | Biddison | 242/7.03 |
| 3,913,220 | 10/1975 | Miller | 242/7.05 R |
| 3,973,738 | 8/1976 | Miller | 242/7.05 B |
| 4,541,575 | 9/1985 | Dickerson | 242/7.03 |
| 4,675,591 | 6/1987 | Pleiss | 310/198 |
| 5,018,676 | 5/1991 | Gulbrandoon | 242/7.03 |
| 5,044,065 | 9/1991 | Dyke et al. | 29/597 |

*Primary Examiner*—Katherine Matecki

[57] ABSTRACT

A method of winding an armature provided with armature slots and a commutator having commutator segments provided with attachment elements. The armature and commutator are mounted on an armature shaft. In the method, a winding wire is fed through the armature slots in accordance with a winding cycle and is attached to the attachmetn elements of the commutator segments to form a first set of coils. The coils are electrically connected to one another via the commutator segments. After finishing the winding cycle, an additional winding cycle is carried out, winding wire again being fed through the armature slots already provided with coil sides of the coils of the first set and being attached to the attachment elements of the commutator segments to form a second set of coils electrically connected in parallel with the coils of the first set.

3 Claims, 1 Drawing Sheet

1

METHOD OF WINDING AN ARMATURE AND ARMATURE PRODUCED BY THE METHOD

BACKGROUND OF THE INVENTION

This invention relates to a method of winding an armature body provided with armature slots. The armature has a commutator mounted on an armature shaft and the commutator segments are provided with attachment elements. Winding wire is fed through the armature slots in accordance with a winding cycle and are attached to the attachment elements of the commutator segments to form a set of coils. The coils are electrically connected to one another via the commutator segments.

The invention also relates to an electric machine provided with a stator and an armature.

The method as described above is generally known and can be carried out with winding machines which are commercially available. Such a winding machine is described, for example, in U.S. Pat. No. 3,473,738 (herewith incorporated by reference). The known method is used to provide a drum-type armature body provided with radial armature slots with a winding distributed over a number of coils, starting from a winding wire which is wound around a hook-type attachment element of a commutator. For the purpose of forming a first coil, the winding wire is then fed a required number of times through two approximately diametrically situated armature slots and finally is wound around a further hook-type attachment element of the commutator. The winding wire is then again fed through two armature slots and wound round yet another hook-type attachment element to form a second coil. This last operation is repeated sufficiently often for the number of required spools to be formed, after which two of the spools are connected to each other via each commutator segment of the commutator by connecting the coil ends electrically to the commutator segments by bending over and heating the hook-type attachment elements. The winding time of the known method can be shortened by using two winding wires, as a result of which symmetrical winding is possible, two coils being formed at the same time.

The known method is suitable for use with thin winding wire, for example, copper wire having a diameter of less than 0.50 mm. For various applications, for example, certain electric motors which are designed for an AC voltage of 100 to 120 V, it is necessary, for considerations of temperature, to use a thicker winding wire, for example, copper wire having a diameter of greater than 0.60 mm. It has been found, however, that the percentage of rejects increases if thicker wire is used, inter alia because, after winding, coil ends touch each other at the attachment elements of the commutator or because an attachment hook is mechanically deformed during the breaking of the wire, which is brought about at the end of winding by a pulling movement.

SUMMARY OF THE INVENTION

An object of the invention is, inter alia, to alter the known method in a manner such that the field of application is extended without the risk of rejection increasing as a result.

The method according to the invention is characterized for this purpose in that, after finishing the winding cycle mentioned, at least one additional winding cycle is carried out, winding wire again being fed through the armature slots already provided with coil sides of the coils of the set mentioned and being attached to the attachment elements of the commutator segments already connected to the coils of the set mentioned to form a further set of coils electrically connected in parallel with the coils of the first-mentioned set.

An advantage of the method according to the invention is that it is now possible to produce armatures, for which relatively thick wires are required for electrical engineering reasons, by winding an armature body with thin wire which can be wound without difficulty. An additional, but not unimportant, advantage is that a commutator of relatively small dimensions can be used. Moreover, the method according to the invention results in a beneficial filling factor of the armature slots. Although the method according to the invention may take somewhat longer than the known method, that is outweighed by the advantages obtained.

An embodiment of the method according to the invention has the characteristic that the winding cycles mentioned are carried out immediately one after another, the winding wire not being broken on passing from the one cycle to the other cycle.

An advantage of this is that, at the beginning of the additional winding cycle, the winding wire is already attached to the correct attachment element of the commutator, which saves an operation and shortens the total winding time.

A further embodiment has the characteristic that the winding cycles mentioned are each carried out in an identical manner. In this manner, coils Another object of the invention is to provide an electric machine in which the armature has been produced by the method according to the invention. This machine is characterized in that two coil sides of a first set of coils electrically connected via a commutator and two coil sides of at least one further set of coils electrically connected via the commutator are present in each armature slot. In such a machine, a beneficial thermal economy can easily be achieved.

BRIEF DESCRIPTION OF THE DRAWINGS

The invention will be described in greater detail by way of example, with reference to the accompanying drawing, wherein.

DESCRIPTION OF THE PREFERRED EMBODIMENTS

Figure 1:
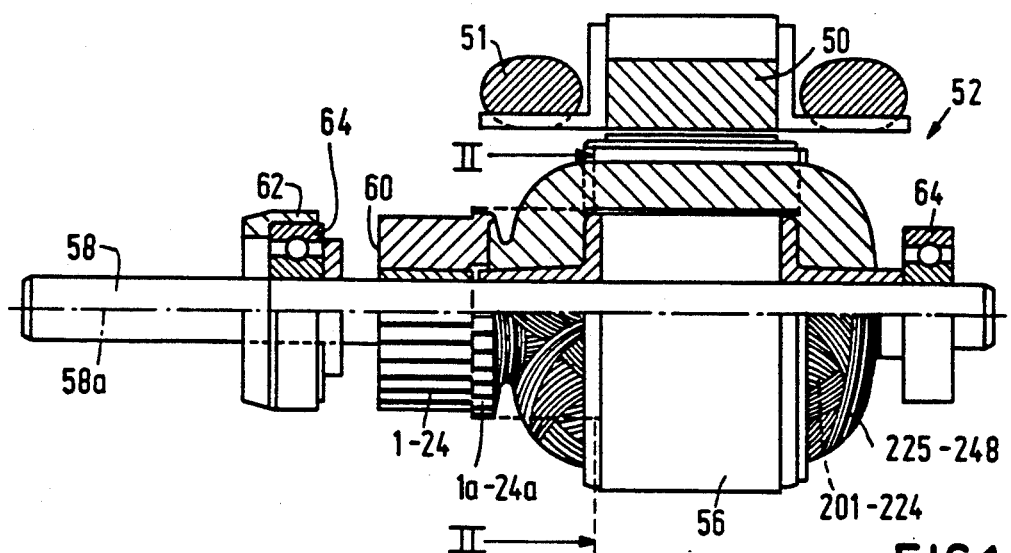
FIG. 1 shows, partly in longitudinal section and partly in side elevation, a part of an electric machine according to the invention.
Figure 2:
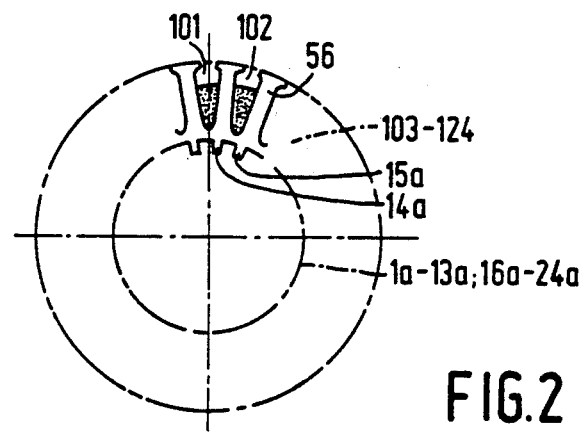
FIG. 2 is a diagrammatic cross section II—II of the machine according to FIG. 1.

The machine according to the invention shown in FIGS. 1 and 2 is constructed as a series-wound motor and is suitable for connection to a 100–120 volt alternating voltage mains. The electric motor has a stator 50, only shown in part, having stator coils 51 and a rotor or armature 52 having an armature winding. The armature 52 comprises a drum-type armature body 56, an armature shaft 58 and a commutator 60. Radially directed armature slots for accommodating coil sides are provided in the armature body 56. The amature body is mounted on the armature shaft 58 and is formed as a laminated core. In this example, the number of armature slots is twenty-four and the armature slots are indicated by the reference numerals 101–124. The armature shaft 58 is mounted on two bearings 62 and 64 so as to be rotatable around its centre line 58a. The commutator 60, also mounted on the armature shaft 58, has twenty-four commutator segments 1-24, each of which is provided with a hook-type attachment element termed a commutator hook for short, 1a-24a.

The amature winding comprises, in this exemplary embodiment, two sets of coils each containing twenty-four, essentially rectangular coils which are indicated diagrammatically in the drawing by 201-224 and 225-248 respectively.

Figure 3:
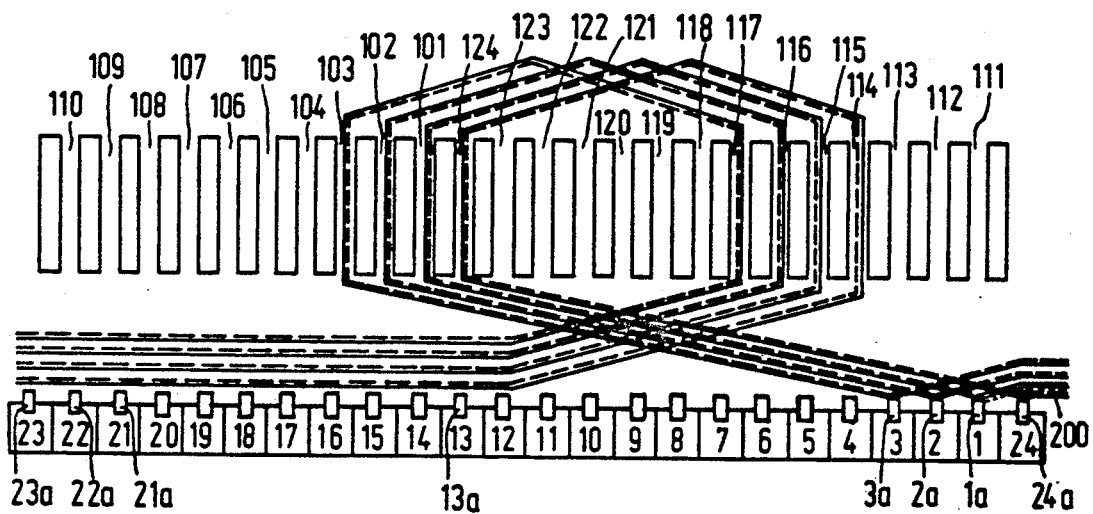
FIG. 3 is a Winding diagram of the machine.

The armature winding, which is produced by the method according to the invention, will now be dealt with in more detail, reference being made to the winding diagram of FIG. 3. As can be deduced from the winding diagram, a winding wire 200, formed by an insulated copper wire having a diameter of 0.40 mm, is attached to one of the commutator hooks. In FIG. 3, this is, by way of example, the commutator hook 1a. The attachment can be carried out by winding the winding wire 200 around the hook a few times. After the attachment mentioned, the winding wire is fed a predetermined number of times in the form of a loop through two of the armature slots, namely the armature slots 101 and 115, and then is wound around the commutator hook 2a. From this point, the winding wire is again fed through two armature slots, in this case the armature slots 102 and 116, and then is wound around the commutator hook 3a. Feeding the winding wire through the armature slots is repeated twenty-two times in this example, the winding wire running from the commutator hook 24a via the armature slots 124 and 114 to the commutator hook 1a in the case of the twenty-fourth time. The winding cycle described above is partly and diagrammatically shown by full lines in the winding diagram of FIG. 3.

After carrying out completely the winding cycle described above, in which one of the sets of twenty-four coils of, for example, every eighteen windings, namely the coils 201-224, are formed, the winding cycle is completely repeated yet again, starting and finishing again at the commutator hook 1a, the other set of coils 225-248 being formed. In the winding diagram of FIG. 3, the additional winding cycle is partly shown diagrammatically by broken lines.

The armature 52, wound by the method according to the invention, has the characteristic that two coil sides of the set of coils 201-224 and also two coil sides of the set of coils 225-248 are accommodated in each armature slot 101-124. The armature 52 furthermore has the characteristic that a coil of the one set is always electrically connected in parallel with a coil of the other set, and this provides a relatively low substitutional resistance of the winding, which results in a beneficial motor efficiency.

For the sake of completeness, it is pointed out that, to shorten the winding time, it is possible in a practical embodiment to use more than one winding wire, for example, two winding wires which, at the beginning of a winding cycle, are each attached to a different commutator hook, for example commutator hooks 1a and 13a respectively, as a result of which two coils of the same set can always be formed at the same time. The final result, a winding having two or possibly more sets of coils, obviously remains the same.

It is furthermore pointed out that the invention is not limited to the exemplary embodiment shown. Machines having different numbers of armature slots and more than two sets of coils also fall within the scope of the invention, as do methods having more than one additional winding cycle.

I claim:

1. A method of winding an armature body provided with armature slots and having a commutator mounted on an armature shaft, said commutator having commutator segments provided with attachment elements, said method comprising the steps of: attaching wire to the attachment elements and feeding the wire through the armature slots in accordance with a first winding cycle to form a first set of coils, said coils being electrically connected to one another via the commutator segments; and performing a second winding cycle which is identical to said first winding cycle and forms a second set of coils similar to the first set of coils whereby, each said coil of the second set of coils is electrically connected in parallel with, lies in the same armature slots as, and is connected to the same attachment elements as a corresponding coil of the first set of coils.

2. A method according to claim 1, characterized in that the second winding cycle is carried out immediately after the first winding cycle, the winding wire not being broken on passing from the first winding cycle to the second winding cycle.

3. An armature for an electric machine, comprising:
    an armature body having an armature shaft, a commutator mounted on the armature shaft, and slots in the armature body, the commutator having a plurality of commutator segments provided with attachment elements;
    a first set of coils, each coil of the first set of coils comprising a wire attached to an attachment element, fed through two of the armature slots, and attached to another attachment element, each coil of the first set of coils being electrically connected to the other coils of that set by the commutator segments;
    a second set of coils similar to the first set of coils;
    wherein each coil of the second set of coils is electrically connected in parallel with, lies in the same armature slots as, and is connected to the same attachment elements as a corresponding coil of the first set of coils.

* * * * *